(12) United States Patent
Fredlund et al.

(10) Patent No.: US 7,724,288 B2
(45) Date of Patent: *May 25, 2010

(54) METHOD OF PROVIDING PHOTOFINISHING SERVICES

(75) Inventors: John R. Fredlund, Rochester, NY (US);
Joseph A. Manico, Rochester, NY (US);
Robert P. Cloutier, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 1152 days.

This patent is subject to a terminal disclaimer.

(21) Appl. No.: 10/895,565

(22) Filed: Jul. 21, 2004

(65) Prior Publication Data

US 2005/0065887 A1    Mar. 24, 2005

Related U.S. Application Data

(63) Continuation-in-part of application No. 10/666,388, filed on Sep. 19, 2003, now Pat. No. 7,492,395.

(51) Int. Cl.
*H04N 5/76* (2006.01)
*G03B 17/02* (2006.01)

(52) U.S. Cl. .............. 348/231.2; 348/231.99; 396/6

(58) Field of Classification Search .............. 348/231.8, 348/231.2, 231.99; 396/6
See application file for complete search history.

(56) References Cited

U.S. PATENT DOCUMENTS

| | | | | |
|---|---|---|---|---|
| 4,870,257 A | * | 9/1989 | Maginness et al. | 235/375 |
| 7,013,288 B1 | * | 3/2006 | Reifel et al. | 705/26 |
| 7,139,095 B1 | * | 11/2006 | Hunter | 358/1.18 |
| 2001/0040625 A1 | * | 11/2001 | Okada et al. | 348/207 |
| 2001/0041072 A1 | * | 11/2001 | Takano | 396/429 |
| 2002/0054212 A1 | * | 5/2002 | Fukuoka | 348/207 |
| 2002/0176711 A1 | * | 11/2002 | Shizukuishi | 396/320 |
| 2002/0196986 A1 | * | 12/2002 | McIntyre | 382/299 |
| 2003/0001957 A1 | * | 1/2003 | Kubota | 348/207.2 |
| 2003/0025808 A1 | * | 2/2003 | Parulski et al. | 348/231.99 |
| 2003/0151669 A1 | * | 8/2003 | Robins et al. | 348/207.99 |

FOREIGN PATENT DOCUMENTS

| | | | |
|---|---|---|---|
| EP | 1213910 A1 | | 6/2002 |
| JP | 05-093950 | * | 4/1993 |
| WO | 03/024083 A2 | | 3/2002 |

* cited by examiner

*Primary Examiner*—Kelly L Jerabek
(74) *Attorney, Agent, or Firm*—Frank Pincelli; Stephen H. Shaw; Eugene I. Shkurko

(57) ABSTRACT

A method of providing photofinishing services, includes the steps of: supplying a memory device for a digital camera and a commitment by a service provider to provide goods and/or services with respect to digital images stored on the memory device to a user of the memory device; taking and storing a plurality of digital images on the memory device; delivering the memory device containing the digital images to the service provider; the service provider providing the goods and/or services to the user; and the service provider returning the memory device to the user.

68 Claims, 4 Drawing Sheets

METHOD OF PROVIDING PHOTOFINISHING SERVICES

CROSS REFERENCE TO RELATED APPLICATIONS

This is a continuation-in-part of application Ser. No. 10/666,388 filed on Sep. 19, 2003 now U.S. Pat. No. 7,492,395 by Marc M. Gibeley, Steven L. Mizelle, John R. Fredlund, Joseph A. Manico, and Robert, P. Cloutier entitled "Method of Providing Photofinishing Services".

FIELD OF THE INVENTION

The present invention relates to a method of providing photofinishing services, and more particularly to a method of providing photofinishing services for users of digital cameras.

BACKGROUND OF THE INVENTION

Photographic film has a long history of providing a means of capturing images. The light sensitive nature of photographic film has provided consumers with a good means of image capture at a reasonable cost. The nature of image capture on film is inherently one time use. The exposed film must be chemically processed to provide images to the consumer, and the film loses its light capturing ability in the processing step.

One time use cameras (OTUCs) are a popular means of enjoying photography. Single use cameras provide ready availability and good image reproduction at a low cost for a photographic system. Film-based OTUC systems have been available for many years, and have provided consumers with an easy way to capture images and receive prints.

Digital cameras use electronic sensors to capture images. The signals captured are digitized and stored as digital data, usually in removable non-volatile memory cards. Due to the cost of the memory cards and reusable capacity, they are not typically used for long term storage. Usually data from the memory card is saved to another data storage means such as a PC hard drive or a CD. At any time, the memory card can be cleared of stored data and reused for additional image capture. This is a primary advantage of digital capture. The disadvantage of digital capture is that if prints are desired, the mechanisms for printing are tedious and confusing for the average consumer. In addition, many of the home printing solutions lack the image permanence consumers have grown accustomed to from photographic printing technology.

Local printing at a home PC is fraught with difficulties since a many step process is usually necessary. Additionally, the process is time consuming and can be expensive when the cost of materials is considered. Online printing presents another set of difficulties. Image uploads are often time consuming and confusing. In addition, the volatile nature of the on-line image storage industry has left many consumers with no access to their on-line image account when the company has ceased operations.

Images from memory cards can be printed at retail establishments. This is not often preferred because of the time necessary to go to a retail establishment and download images from the card, and also for the selection process of choosing the images that are desired for printing and choosing from a variety of print formats and image products. In addition, if a photo kiosk such as the "Kodak Picture Maker", sold by the Eastman Kodak Company, is used, queuing and the lack of privacy may present obstacles to the user. The card can be dropped off at a retail establishment for later printing, but the cost of the card is high enough that many consumers are reluctant to purchase a second card to use while the other one is at the printer, preventing use of the digital camera until the printer has finished using the card, or to risk losing the card at the printer.

Recently, fully digital one time use cameras (DOTUCs) have appeared on the market; see for example EP 1212910A1, Hirata et al., published Jun. 12, 2002, and WO 03/024083A2, Braunstein, et al., published Mar. 20, 2003. These are DOTUCs that provide the one time use benefits previously provided by film systems. These systems capture images with an electronic sensor and store the digital image files in digital memory. Because of the high value of the camera and memory, these systems force the consumer to return the camera to the retailer before the images can be accessed. Often the images are in encrypted form and are completely inaccessible to the consumer until the camera is returned. In addition, no means is provided to review the images with the camera since due to manufacturing cost, unlike most digital cameras, no image display is provided. Furthermore, the DOTUCs are designed to take a fixed number of images, such as 25, and no contingency is provided to add more memory, such as by adding a new memory card, or extracting the digital image files from the camera by anyone other than the retailer.

What is needed is a system that allows for the ease of use and ready availability of the film system for obtaining prints while maintaining the flexibility of the digital system for viewing and sharing images.

SUMMARY OF THE INVENTION

In accordance with one aspect of the present invention there is provided a method of providing photofinishing services, comprising the steps of:

a) supplying a memory device for a digital camera and a commitment by a service provider to provide goods and/or services with respect to digital images stored on the memory device to a user of the memory device;

b) taking and storing a plurality of digital images on the memory device;

c) delivering the memory device containing the digital images to the service provider;

d) the service provider providing the goods and/or services to the user; and e) the service provider returning the memory device to the user to repeat steps b) through e).

In accordance with another aspect of the present invention there is provided a method of providing photofinishing services, comprising the steps of:

a) supplying a memory device for a digital camera and a commitment by a service provider to provide goods and/or services with respect to digital images stored on the memory device to a user;

b) storing a plurality of digital images on the memory device;

c) delivering the memory device containing the digital images to a service provider;

d) the service provider redeeming the commitment by providing the goods and/or service to the user; and e) the service provider erasing the digital images from the memory device and supplying the memory device to another user to repeat steps b) through e).

In accordance with still another aspect of the present invention there is provided a method of providing photofinishing goods and/or services, comprising the steps of:

a) supplying a memory device for a digital camera and a commitment by a service provider to produce output from digital images stored on the memory device to a user;

b) storing a plurality of digital images on the memory device;

c) transmitting the digital images to an Internet service provider; and d) redeeming the commitment by producing the output from the digital images.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
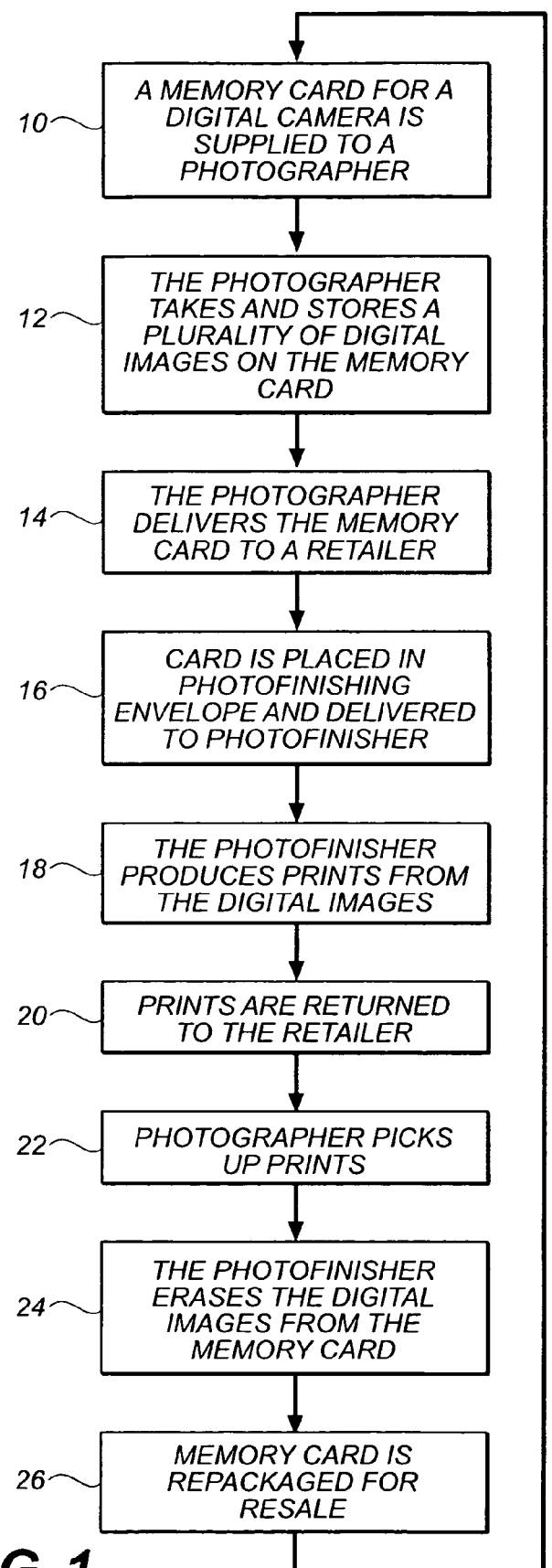
FIG. 1 is a flow chart describing a method of delivering photofinishing services according to the present invention.

Referring to FIG. 1, the present invention is directed to a system for recycling reusable memory devices such as magnetic, optical, and solid state memory such as an EEPROM for digital cameras. The following description describes the use of a memory card containing a solid state memory, however any reusable memory device can be employed. The one time use memory card is sold with a commitment by a service provider or its agents or associates to provide image goods and/or services from the images that are captured and stored on the memory card. The one time use memory card may be of several different well-known formats such as CF, MMC, SD, xD, Memory Stick. In step 10, the user/photographer buys the one time use memory card that is appropriate for his camera. This one time use memory card is inserted in the removable memory card slot in the user's camera. In step 12, pictures are taken and stored on the one time use memory card in the usual fashion. When the user is done capturing images, the user returns the card to a retail photofinishing counter in step 14.

The card is placed in a photofinishing envelope with the user's name and other pertinent information and the envelope is picked up and delivered to a service provider/photofinisher in step 16. Alternately, the service provider may be at the same location as the retail photofinishing counter. The service provider reads the image files from the one time use card and prints images from these files in step 18. In a preferred embodiment, the photofinisher also creates a CD of the image files. It is understood that other imaging services such as creating a CD may be included when this example mentions creation of prints. In step 20, the prints and CD are placed in the envelope and shipped back to the retailer. The user picks up the prints and CD at the photofinishing counter in step 22.

There are other fulfillment options. In particular, the retail service provider may offer to read and print the images at the retail location. The retail photofinisher can offer to provide prints in a short time for an additional fee without redeeming the value associated with the memory. Although the user has already purchased the commitment for providing goods and/or services from the original provider of the card, the retail photofinisher can offer to create the prints for a fee and also return the memory card to the user. In this case the memory card need not be erased. However, the memory card may be erased if the user desires this erasure.

The memory card may be sold with a commitment for any desired goods and/or services. For example, in addition to providing prints, the memory card can be sold with a commitment to create a CD or DVD from the images. Or the memory card can be sold with a commitment to post the images on the web or to email the images to specified parties. In the case of posting the images, the photofinisher creates a web page or pages that contain the images for viewing. URLs and passwords can be sent to the user electronically or by physical media, or placed on the memory device if the memory device is returned to the user. URLs and passwords can likewise be incorporated on memory devices such as a DVD if such a memory device is created for the user. In the case of emailing images to specified parties, the user must submit the email addresses when submitting the memory card for processing, or at some time later. These images are formatted appropriately for emailing by the photofinisher.

Alternatively the user may insert the one time use memory card into an image kiosk such as the Kodak Picture Maker, which produces prints and CDs from prints and from one time use memory cards. The retailer may also choose to provide "while you wait" printing using a digital minilab or any other suitable printer such as a thermal dye transfer printer and CD or DVD writer.

The one time use memory card is retained by the photofinisher and recycled for resale. The recycling operation includes step 24, erasure of the memory card so that image data from the user will not be available to the next user buying the memory card or recoverable by more sophisticated means. The recycling operation may also include a verification of the useful capacity of the one time use memory card by writing a test pattern to the one time use memory card and then reading it back or by other means such as formatting the memory device. The writing of the test pattern may also erase the card. The one time use memory card is cleared of image files before resale. The memory card may also be inspected for any visual or cosmetic defects and sanitized to prevent the spread of contact transmitted germs. The photofinisher may also include in the memory a record of how many times the memory card has been recycled. The memory card is then repackaged and provided for resale in step 26. The memory card is returned to the retailer to be repurchased in step 10.

Figure 10:
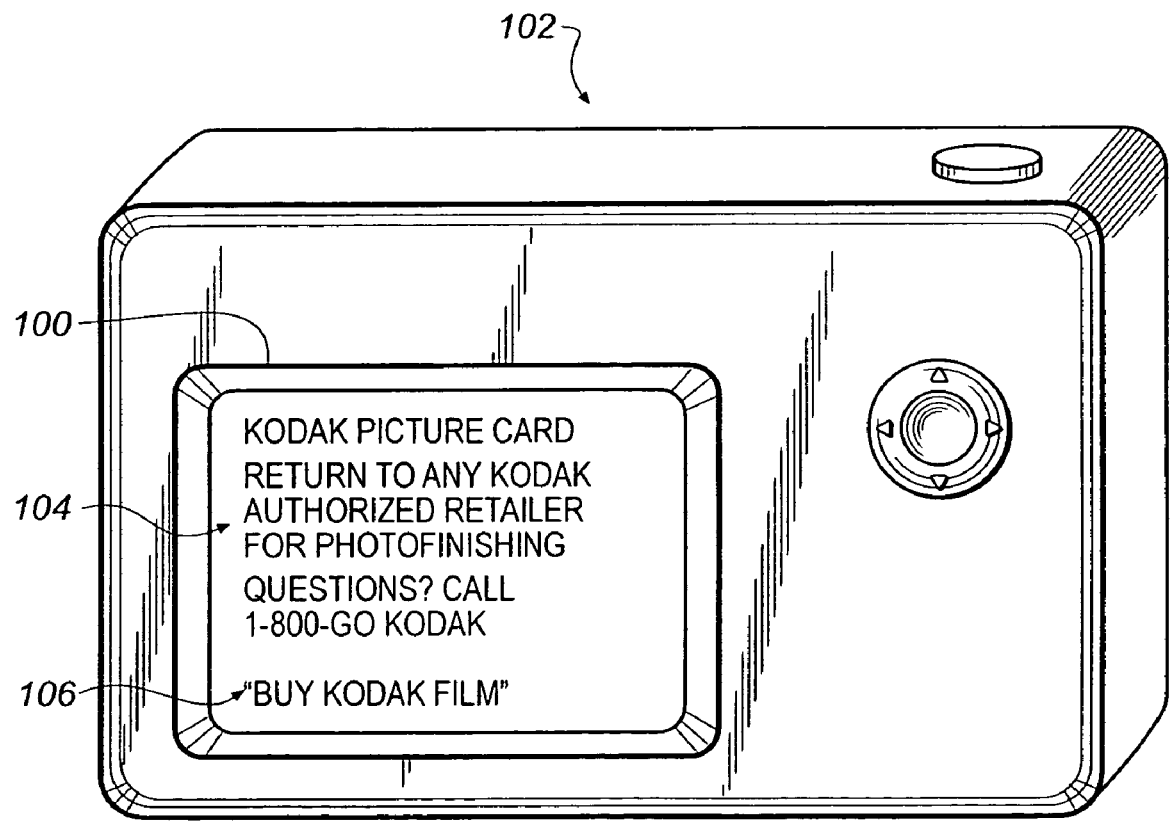
FIG. 10 shows a digital camera displaying a prerecorded image from the memory device.

Referring to FIG. 10, an image can also be prerecorded on the one time use memory card that can be viewed by the customer on a camera display 100 when the card is placed in a camera 102. The pre-recorded image can be, for example, instructions 104 to the customer for using the photofinishing services of the present invention, the file could include a means to verify that payment for photofinishing services has been made, with a unique ID number and/or image. Alternatively, the message can be paid advertising 106.

Figure 2:
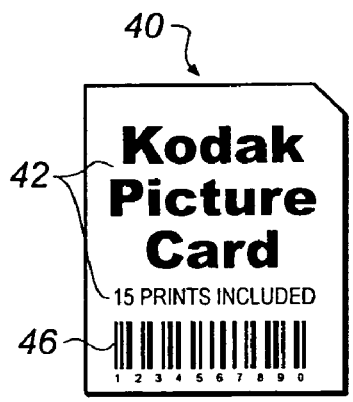
FIG. 2 is schematic diagram of a memory device useful with the present invention.

For the purposes of this example, the commitment described is for making prints, but it is understood that the commitment may be for other types of output such as CDs, DVDs, or posting to a website. The commitment to create prints can take many forms. The graphics 42 on the one time use memory card may indicate that the one time use memory card carries with it a commitment to create prints as shown in FIG. 2. When one time use memory card 40 is received at the retail photofinishing counter, the indication that prints will be created is graphics 42, such as with a removable coupon. Thus the user need only fill out a photofinishing bag and include the one time use memory card 40 since graphics 42 will alert the photofinisher that prints are to be created.

Figure 3:
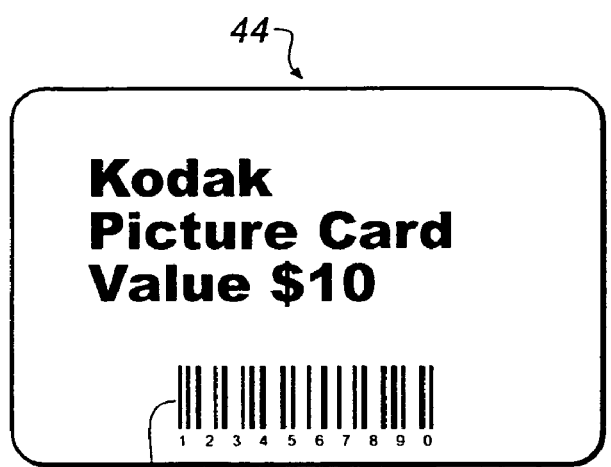
FIG. 3 is a schematic diagram of a prepaid debit card useful with the present invention.
Figure 4:
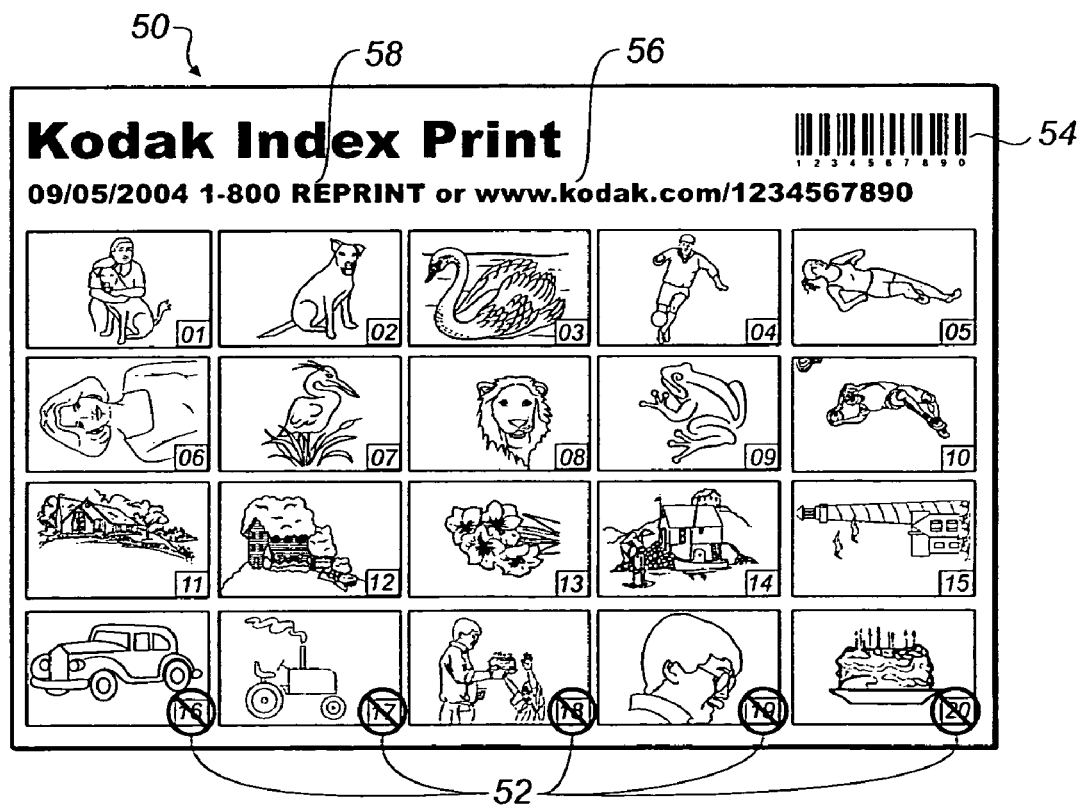
FIG. 4 is an index print useful with the present invention.

As shown in FIG. 3, another manner of communicating the commitment to provide goods and/or services is to include debit card 44 with memory card 40 at the time of sale. In this example, the images on memory card 40 will only be printed without additional cost if debit card 44 is produced at the retail counter when the user returns the one time use memory card 40.

A code 46 on the one time use memory card 40 may also indicate to the photofinisher that memory card 40 carries with it the commitment to create prints. Additionally, code 46 can take the form of an ID or similar number or file that resides on the card. The photofinisher may query the one time use memory card 40 to determine if memory card 40 carries with it the commitment to create prints. If the code corresponds to a valid code saved in a database at the photofinisher, then the photofinisher will create the prints. The code is placed on the card before the time of first sale and then again during the recycling operation. This code may be hidden from the user by residing in a pseudo bad sector of the card. That is to say that the controller of the card will not allow the user to access the portion of the card where the ID or file resides. This information may also be stored as a "hidden file". In addition, this code may be stored as a machine and or eye readable unique ID number, alphanumeric sequence, or encrypted code printed on an external surface of the memory card or stored internally as digital image data.

When the user captures images, he may capture more or less than a pre-defined number for which prints are promised. In the case where the user captures more than the pre-defined number, only the pre-defined number is printed. For the purpose of this example, the pre-defined number of prints is 15. If 20 image files reside on the one time use memory card, only the most recent 15 will be printed. Alternatively, the 15 first images will be printed. In both cases, when the images are printed, if a CD is created, the CD may contain all the images that are on the one time use memory card. Thus no image files are lost, and the user maintains the ability to print the additional images by accessing the image files on the CD.

An index print 50 can be included with the order and the extra images may be included on index print 50. Index print 50 could include graphic or textual information 52 indicating which images had been printed or which images had not been printed. Index print 50 includes instructions on how prints or other imaging services may be obtained for the additional images (not shown). These instructions will include access code 54 and website 56 or phone number 58 that allows the user to order additional prints.

In the case where one time use memory card 40 is returned with less than the predefined number of image files, a credit for the additional images can be returned with the prints. This credit can take the form of a coupon good for a reduction in price of the next purchase of a one time use memory card. The credit could be applied to a second debit card similar to debit card 44, but this second debit card is included in the return envelope with the prints instead of being included with the purchase of the one time use memory card 40. In addition duplicate prints can be made of the image files to increase the number of prints until the predefined number of prints is reached.

The invention allows the user to capture and delete images as usual with any memory card. The user can download images from the card and share via email as usual. Preferably, the usage of the card and the images is not restricted. The images are not encrypted in any fashion to restrict usage. The images on the card need not be captured by the user, but can also be from other sources such as shared image files from the cameras of friends.

Figure 5:
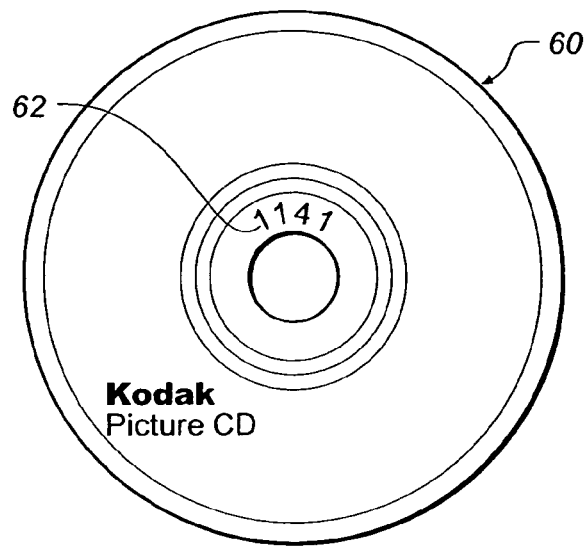
FIG. 5 is a CD useful with the present invention.
Figure 6:
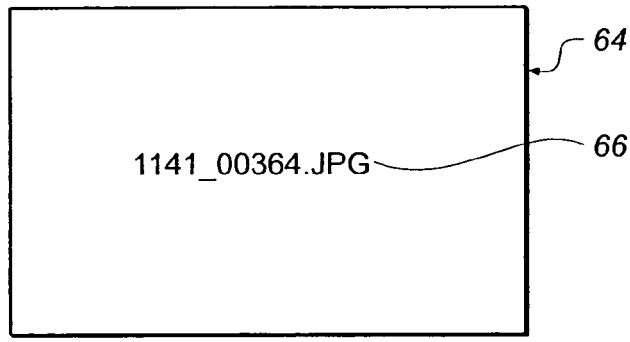
FIG. 6 is a view of the back of a photographic print having an image identifier useful with the present invention.

The prints returned to the user may have an indication of the source file. For example, CD 60 with identifier 62 shown in FIG. 5 is returned along with the prints created from image files on memory card 40. As shown in FIG. 6, each print 64 may have identifier 66 printed on the back that indicates which CD 60 contains the image file corresponding to the print, and which file on CD 60 corresponds to the print. Thus determining the image file for reprinting and sharing is facilitated.

Figure 7:
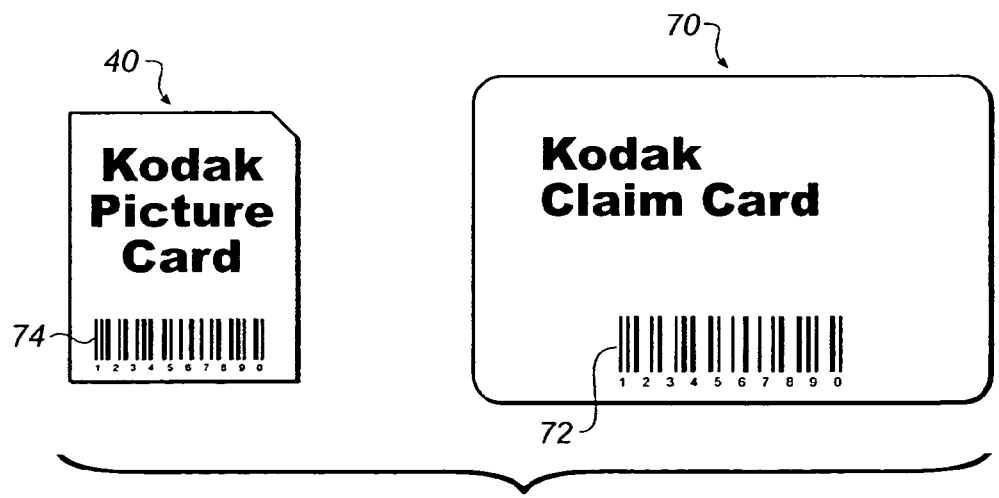
FIG. 7 is a schematic diagram of a memory device and a claim card useful with the present invention.

Additional features can be included with the card when it is sold to improve ease of use. As shown in FIG. 7, a claim card 70 may be included with the one time use memory card 40. The claim card has ID 72 that is human or machine readable. Memory card 40 also contains the same ID, either as graphic 74 or in memory. When memory card 40 is returned to the photofinisher, the user need not fill out any information on the photofinishing bag if he has retained claim card 70. Memory card 40 is placed in the bag and the photofinisher creates the prints as usual. After the prints are returned, the user need only present claim card 70 to pick up his prints. If the user loses the claim card, then he must fill out the photofinishing bag.

Figure 8:
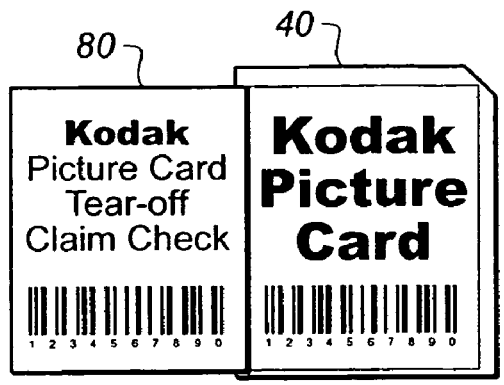
FIG. 8 is a schematic diagram of a memory device having a tear off claim check useful with the present invention.

As shown in FIG. 8, this same effect may be obtained if memory card 40 has tear-off or otherwise removable label 80. Label 80 can be removed from the card and kept in the possession of the user. After the prints are returned, the user need only present the label to pick up his prints. This technique may also be used as prepayment verification means such as a coupon redeemable for prints.

Figure 9:
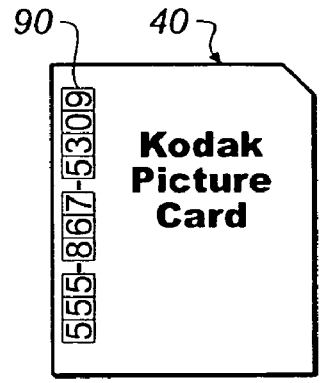
FIG. 9 is a schematic diagram of a memory device having an area for writing a phone number useful with the present invention.

Another means of minimizing the amount of data necessary for insuring that the prints are returned to the proper user is to require a phone number 90 of the user on the photofinishing envelope (not shown) or memory card 40, as shown in FIG. 9. Unique phone number 90 including area code can be used to track the photofinishing order, and can also be used to alert the user that his prints are available for pickup. The user's email address will also serve this purpose. These unique IDs can also be written on card 40. Phone number 90 can also be used by the manufacturer and retailer to obtain demographic information about customers.

The memory card may also be used to redeem services via a network such as the Internet. In this case, an Internet photofinisher/service provider such as Ofoto provides the commitment for prints or services. The memory card is purchased by the user with the knowledge that the images captured by the user will be uploaded to the Internet photofinisher and printed or have other services rendered. A card ID is provided in data shipped with the card. The Internet photofinisher looks for this ID to ascertain the validity of the request for prints or services. Additionally, there may be passwords or other security measures included when the card is purchased.

The memory card can also contain software that enables the user's PC to connect to the Internet photofinishing site. This software is an executable that uses the resident browser to connect and transmit the images to the Internet photofinisher.

During the dialog between the user and the Internet photofinisher, an offer is made to the user to recharge the card (reestablish a commitment to provide goods and/or services). The user can reuse the card by accepting the offer and making payment to the Internet photofinisher. Discounts or other incentives may be offered so that the user will recharge the memory card.

The invention has been described in detail with particular reference to certain preferred embodiments thereof, but it will be understood that variations and modifications can be effected within the scope of the invention, the present invention being defined by the claims set forth herein.

PARTS LIST 10 supply memory card step
12 take pictures and store on memory card step
14 deliver memory card to retailer step
16 deliver memory card to photofinisher step
18 produce prints step
20 return prints to retailer step
22 photographer picks up prints step
24 photofinisher erases images from memory card step
26 repackage memory card for resale step
40 one time use memory card
42 graphics
44 bit card
46 code
50 index print
52 information
54 access code
56 website
58 phone number
60 CD
62 identifier
64 print
66 identifier
70 claim card
72 ID
74 ID
80 label
90 phone number
100 camera display
102 camera
104 instructions
106 advertisement

What is claimed is:

1. A method of providing photofinishing services, comprising the steps of:
    recording digital commitment data on a digital memory device, the memory device for coupling to a digital camera and for storing digital images captured by the digital camera, the commitment data not accessible by a user and for identifying a service provider and a commitment to provide goods or services with respect to the digital images stored on the memory device to the user of said memory device;
    providing the memory device to a photofinisher including the photofinisher retrieving the commitment data and the digital images from the memory device;
    the photofinisher comparing the commitment data recorded on the memory device with a code stored in a database accessible by the photofinisher including providing said goods or services to the user in response to the commitment data corresponding to the code stored in the database; and
    the photofinisher returning the memory device to the user.

2. The method according to claim 1, further comprising a step of establishing a second commitment with the photofinisher to provide goods and/or services with respect to images on said memory device.

3. The method claimed in claim 1, further comprising the steps of the photofinisher producing an index print and/or CD of the digital images from the memory device and returning the index print and/or CD to the photographer.

4. The method claimed in claim 3, wherein the memory device is capable of holding a number N of digital images and the photofinisher produces prints for only the first M images, where M is less than N, but the index print and/or the CD contain all N of the digital images on the memory device.

5. The method claimed in claim 4, wherein the index print and/or the CD contain all N of the digital images on the memory device and indicates which images have or have not been printed.

6. The method claimed in claim 5, wherein the index print and/or the CD contain instructions for obtaining prints of the unprinted images.

7. The method claimed in claim 1, wherein the memory device is adapted for use with a particular camera model, and further comprising the step of offering a number of different memory devices for different camera models.

8. The method claimed in claim 1, wherein the memory device is a CF, MMC, SD, xD, or Memory Stick.

9. The method claimed in claim 1, wherein the memory device bears a code that indicates to the photofinisher that the memory device carries with it the commitment to create prints.

10. The method claimed in claim 1, wherein the memory device bears a graphic that indicates that the card caries with it the commitment to create prints.

11. The method claimed in claim 1, wherein the memory device is returned with less than a predefined number of image files, and including the step of providing a credit to the user.

12. The method claimed in claim 11, wherein the credit is in the form of a coupon.

13. The method claimed in claim 11, wherein the credit is in the form of a debit card that is returned with the prints.

14. The method claimed in claim 1, wherein a debit card for goods and/or services is supplied to the user along with the memory device and the debit card is presented to the photofinisher along with the memory device.

15. The method claimed in claim 1, wherein the memory device includes a protected memory area that is accessible by a supplier and the service provider, but not by the user.

16. The method claimed in claim 15, wherein the protected memory area contains a unique ID.

17. The method claimed in claim 15, wherein the protected memory area contains a number indicating the number of times that the memory device has been recycled.

18. The method claimed in claim 15, wherein the protected memory area contains instructions for the photofinisher provided by the supplier.

19. The method claimed in claim 1, further comprising the steps of supplying a claim card for retrieving goods and/or services to the user along with the memory device and presenting the claim card to the photofinisher to retrieve the photofinishing order.

20. The method claimed in claim 1, further comprising the steps of supplying a removable tag for retrieving goods and/or services to the user along with the memory device and presenting the removable tag to the photofinisher to retrieve the photofinishing order.

21. The method claimed in claim 1, further comprising the step of writing an identifier unique to the user on the memory device and presenting the identifier unique to the user to the photofinisher to retrieve the photofinishing order.

22. The method claimed in claim 1, further comprising the step of writing a phone number or e-mail address of the user on a memory device and presenting the phone number or e-mail address to the service provider to retrieve the photofinishing order.

23. The method claimed in claim 1, further comprising the step of writing a phone number or e-mail address of the user on a photofinishing envelope and presenting the phone number or e-mail address to the photofinisher to retrieve the photofinishing order.

24. The method claimed in claim 1, wherein the step of erasing the digital images from the memory device include writing a test pattern onto the memory device.

25. The method claimed in claim 1, wherein the memory device includes a prerecorded image.

26. The method claimed in claim 25, wherein the prerecorded image contains instructions to a user for using the photofinishing services.

27. The method claimed in claim 25, further comprising the step of selling advertising space in the prerecorded image.

28. The method claimed in claim 1, wherein the memory device bears a code in a hidden file or pseudo bad sector of the memory that indicates to the photofinisher that the memory device carries with it the commitment to create prints.

29. The method claimed in claim 1, further comprising the steps of the photofinisher producing an index print and CD of the digital images from the memory device and returning the index print and CD to the user, and indicating with at least one index image the filename of the corresponding image file recorded on the CD.

30. The method claimed in claim 1, further comprising the steps of the photofinisher producing at least one print and a CD of the digital images from the memory device and returning the at least one print and CD to the user, and indicating on the at least one print the filename of the corresponding image file recorded on the CD.

31. A method of providing photofinishing services, comprising the steps of:
   recording digital commitment data on a digital memory device, the memory device for coupling to a digital camera and for storing digital images captured by the digital camera, the commitment data not accessible by a user and for identifying a service provider and a commitment to provide goods or services with respect to the digital images stored on the memory device to the user of said memory device;
   providing the memory device to a photofinisher including the photofinisher retrieving the commitment data and the digital images from the memory device;
   the photofinisher redeeming the commitment by providing said goods and/or service to the user only if the commitment data recorded on the memory device corresponds to a code stored in a database accessible by the photofinisher; and
   the photofinisher erasing the digital images from the memory device and supplying the memory device to another user.

32. The method according to claim 31, further comprising the step of the photofinisher establishing a second commitment to provide goods and/or services with respect to images on said memory device.

33. The method claimed in claim 31, further comprising the steps of the photofinisher producing an index print and/or CD of the digital images from the memory device and returning the index print and/or CD to the photographer.

34. The method claimed in claim 33, wherein the memory device is capable of holding a number N of digital images and the photofinisher produces prints for only the first M images, where M is less than N, but the index print and/or the CD contain all N of the digital images on the memory device.

35. The method claimed in claim 34, wherein the index print and/or the CD contain all N of the digital images on the memory device and indicates which images have or have not been printed.

36. The method claimed in claim 35, wherein the index print and/or the CD contain instructions for obtaining prints of the unprinted images.

37. The method claimed in claim 31, wherein the memory device is adapted for use with a particular camera model and further comprising the step of offering a number of different memory devices for different camera models.

38. The method claimed in claim 31, wherein the memory device is a CE, MMC, SD, xD, or Memory Stick.

39. The method claimed in claim 31, wherein the memory device bears a code that indicates to the photofinisher that the memory device carries with it the commitment to create prints.

40. The method claimed in claim 31, wherein the memory device bears a graphic that indicates that the card carries with it the commitment to create prints.

41. The method claimed in claim 31, wherein the memory device is returned with less than a predefined number of image files, and including the step of providing a credit to the user.

42. The method claimed in claim 41, wherein the credit is in the form of a coupon.

43. The method claimed in claim 41, wherein the credit is in the form of a debit card that is returned with the prints.

44. The method claimed in claim 31, wherein a debit card for goods and/or services is supplied to the user along with the memory device and the debit card is presented to the photofinisher along with the memory device.

45. The method claimed in claim 31, wherein the memory device includes a protected memory area that is accessible by a supplier and the photofinisher, but not by the user.

46. The method claimed in claim 45, wherein the protected memory area contains a unique ID.

47. The method claimed in claim 45, wherein the protected memory area contains a number indicating the number of times that the memory device has been recycled.

48. The method claimed in claim 45, wherein the protected memory area contains instructions for the photofinisher provided by the supplier.

49. The method claimed in claim 31, further comprising the steps of supplying a claim card for retrieving goods and/or services to the user along with the memory device and presenting the claim card to the photofinisher to retrieve the photofinishing order.

50. The method claimed in claim 31, further comprising the steps of supplying a removable tag for retrieving goods and/or services to the user along with the memory device and presenting the removable tag to the photofinisher to retrieve the photofinishing order.

51. The method claimed in claim 31, further comprising the step of writing an identifier unique to the user on the memory device and presenting the identifier unique to the user to the photofinisher to retrieve the photofinishing order.

52. The method claimed in claim 31, further comprising the step of writing a phone number or e-mail address of the user on a memory device and presenting the phone number or e-mail address to the service provider to retrieve the photofinishing order.

53. The method claimed in claim 31, further comprising the step of writing a phone number or e-mail address of the user on a photofinishing envelope and presenting the phone number or e-mail address to the service provider to retrieve the photofinishing order.

54. The method claimed in claim 31, wherein the step of erasing the digital images from the memory device include writing a test pattern onto the memory device.

55. The method claimed in claim 31, wherein the memory device includes a prerecorded image.

56. The method claimed in claim 55, wherein the prerecorded image contains instructions to a user for using the photofinishing services.

57. The method claimed in claim 55, further comprising the step of selling advertising space in the prerecorded image.

58. The method claimed in claim 31, wherein the memory device bears a code in a hidden file or pseudo bad sector of the memory that indicates to the photofinisher that the memory device carries with it the commitment to create prints.

59. The method claimed in claim 31, further comprising the steps of the photofinisher producing an index print and CD of the digital images from the memory device and returning the index print and CD to the user, and indicating with at least one index image the filename of the corresponding image file recorded on the CD.

60. The method claimed in claim 31, further comprising the steps of the photofinisher producing at least one print and a CD of the digital images from the memory device and returning the at least one print and CD to the user, and indicating on the at least one print the filename of the corresponding image file recorded on the CD.

61. A method of providing photofinishing goods or services, comprising the steps of:
  a) storing a plurality of captured digital images on a digital memory device, the memory device including digital commitment data not accessible by a user for identifying a commitment and for identifying a service provider to produce output from the digital images stored on the memory device to the user;
  b) reading the commitment data and the plurality of digital images on the memory device;
  c) transmitting the commitment data and the digital images to an Internet service provider; and
  d) the Internet service provider redeeming the commitment, upon satisfactory transmission of the commitment data and the digital images to the Internet service provider and upon a satisfactory comparison of the commitment data and a valid code stored in a data base accessible by the Internet service provider, by producing said output from said digital images.

62. The method claimed in claim 61, further comprising the steps of establishing the commitment to produce output for digital images stored on the memory device.

63. The method claimed in claim 61, further comprising the steps of using transmission software on said memory device for connecting to an Internet photofinisher.

64. The method claimed in claim 61, further comprising the steps of the photofinisher supplying software on said memory device for use in connection to an Internet photofinisher.

65. The method claimed in claim 61, further comprising the steps of the photofinisher creating duplicate prints in order to fulfill the commitment.

66. The method claimed in claim 61, further comprising the steps of supplying a URL or password on said returned memory device.

67. The method claimed in claim 61, further comprising the means for identifying said memory device.

68. The method claimed in claim 61, further comprising the means for identifying said commitment.

* * * * *